(12) United States Patent
Kanada et al.

(10) Patent No.: US 7,803,862 B2
(45) Date of Patent: *Sep. 28, 2010

(54) COMPOSITION FOR POLYOLEFIN RESIN FOAM, FOAM OF THE SAME, AND PROCESS FOR PRODUCING FOAM

(75) Inventors: Mitsuhiro Kanada, Ibaraki (JP); Katsuhiko Tachibana, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/927,008

(22) Filed: Aug. 27, 2004

(65) Prior Publication Data

US 2005/0049322 A1 Mar. 3, 2005

(30) Foreign Application Priority Data

Aug. 28, 2003 (JP) .................... P. 2003-209196

(51) Int. Cl.
  *C08K 3/34* (2006.01)
  *C08J 3/22* (2006.01)
  *C08F 290/14* (2006.01)
  *C08F 8/00* (2006.01)
  *C08L 45/00* (2006.01)
  *C08L 23/00* (2006.01)

(52) U.S. Cl. .................. 524/444; 524/450; 524/451; 525/50; 525/191; 525/211; 525/240

(58) Field of Classification Search ................. 524/444, 524/450, 451; 525/50, 191, 211, 240
See application file for complete search history.

(56) References Cited

U.S. PATENT DOCUMENTS

| 3,432,483 | A | * | 3/1969 | Beatty et al. ................. 528/494 |
| 5,840,229 | A | * | 11/1998 | Sugimoto et al. ........... 264/142 |
| 6,030,696 | A | * | 2/2000 | Lee ............................ 428/220 |
| 6,221,964 | B1 | | 4/2001 | Brzoskowski et al. |
| 6,297,301 | B1 | | 10/2001 | Erderly et al. |
| 2004/0000581 | A1 | * | 1/2004 | Brandolini et al. ......... 229/68.1 |
| 2004/0162358 | A1 | * | 8/2004 | Yamamoto et al. ............ 521/79 |

FOREIGN PATENT DOCUMENTS

| EP | 1 449 868 A1 | 8/2004 |
| JP | 9-208771 A | 8/1997 |
| JP | 2001-348452 A | 12/2001 |

OTHER PUBLICATIONS

European Search Report dated Dec. 10, 2004.

* cited by examiner

*Primary Examiner*—William K Cheung
(74) *Attorney, Agent, or Firm*—Sughrue Mion, PLLC

(57) ABSTRACT

A composition for polyolefin resin foam, which comprises a polymer component comprising a polyolefin resin and a rubber and/or thermoplastic elastomer, and a powder particle, wherein the composition has an extensional viscosity as measured with a capillary rheometer (temperature, 200° C.; shear rate, 5,000 [1/s]) of from 20 to 100 kPa·s.

6 Claims, No Drawings

COMPOSITION FOR POLYOLEFIN RESIN FOAM, FOAM OF THE SAME, AND PROCESS FOR PRODUCING FOAM

FIELD OF THE INVENTION

The present invention relates to a composition for polyolefin resin foam which is excellent in softness, cushioning property, heat-insulating property, etc., and to a foam obtained therefrom and a process for producing the foam. More particularly, the invention relates to a composition suitable for use in producing a thick polyolefin resin foam therefrom.

BACKGROUND ART

Foams to be used as internal insulators for electronic appliances or the like, cushioning materials, sound insulators, heat insulators, food packaging materials, clothing materials, building materials, and the like are required to have properties such as softness, cushioning properties, and heat-insulating properties from the standpoint of securing the sealing and other properties of such foams in the case where the foams are incorporated as parts.

These foams are further required to have a given thickness so as to retain sealing properties. Known as such foams are polyolefin resin foam such as polyethylene and polypropylene foams. However, these foams have had a problem that they have a poor strength and are insufficient also in softness and cushioning property. Techniques for improving these insufficient properties are being employed, which are to heighten the expansion ratio and to incorporate a rubber ingredient or the like into a polyolefin resin to soften the material itself.

However, since ordinary polyethylene or polypropylene is low in the viscosity relating to the stress required for high-temperature stretching, i.e., extensional viscosity, a foaming operation conducted so as to obtain a high expansion ratio results in cell wall breakage and hence in gas escape and cell enlargement. It has therefore been difficult to obtain a soft foam having the desired high expansion ratio.

Known processes heretofore in use for producing a polymer foam include a chemical process and a physical process. The general physical process comprises dispersing a low-boiling liquid (blowing agent) such as a chlorofluorocarbon or hydrocarbon in a polymer and then heating the dispersion to volatilize the blowing agent and thereby form cells. The chemical process for obtaining a foam comprises pyrolyzing a compound (blowing agent) added to a polymer base to generate a gas and thereby form cells. However, the technique of physical foaming has various environmental problems such as the harmfulness of the substance used as a blowing agent and ozonosphere depletion caused by the substance, while the technique of chemical foaming has a problem that a residue of the blowing agent remains after gas generation in the foam and this residue is causative of pollution especially in applications such as electronic parts.

On the other hand, a process for obtaining a foam having a small cell diameter and a high cell density has recently been proposed. This process comprises dissolving a gas such as nitrogen or carbon dioxide in a polymer at a high pressure, subsequently releasing the polymer from the pressure, and heating the polymer to a temperature around the glass transition temperature or softening point of the polymer to thereby form cells. In this foaming technique, nuclei are formed in a system in a thermodynamically unstable state and these nuclei expand and grow to form cells and thereby give a micro-cellular foam.

This process has an advantage that a foam having a microcellular structure which has not been obtained so far can be produced. Various attempts to apply this foaming technique to thermoplastic elastomers including thermoplastic polyurethanes have been proposed. However, a sufficiently high expansion ratio has not been obtained and the foams obtainable with the technique have been limited to thin foams.

For overcoming those problems, a polyolefin resin foam made of a blend of a polyolefin resin having, for example, a melt tension exceeding 1 cN at 230° C. and a rubber or thermoplastic elastomer ingredient and a process for foam production using carbon dioxide in a supercritical state have been proposed (patent document 1). Furthermore, it has been disclosed that a polystyrene composition having specific values of extensional viscosity, weight-average molecular weight, etc. has excellent suitability for foaming (patent document 2).

[Patent Document 1]
    JP-A-2001-348452 (Claims)

[Patent Document 2]
    JP-A-09-208771 (Claims)

SUMMARY OF THE INVENTION

An object of the invention is to provide a polyolefin resin foam which is excellent in softness and cushioning property and has a sufficient thickness. Another object of the invention is to provide a process for producing the foam.

The present inventor made intensive investigations in order to overcome the problems described above. As a result, it has been found that when a composition for polyolefin resin foam which comprises a polymer component comprising a polyolefin resin ad a rubber and/or thermoplastic elastomer and a powder particle and has an extensional viscosity as measured with a capillary rheometer (temperature, 200° C.; shear rate, 5,000 [1/s]) of from 20 to 100 kPa·s is subjected to foam molding, then cells grow without undergoing considerable contraction or deformation after foaming and can retain their shape and, hence, a foam having an increased thickness and excellent cushioning properties is obtained. The invention has been completed based on this finding.

Namely, the present invention has the following constitution.

(1) A composition for polyolefin resin foams which comprises:
    a polymer component comprising a polyolefin resin and a rubber and/or thermoplastic elastomer, and
    a powder particle,
    wherein the composition has an extensional viscosity as measured with a capillary rheometer (temperature, 200° C.; shear rate, 5,000 [1/s]) of from 20 to 100 kPa·s.

(2) The composition for polyolefin resin foam according to the above (1), wherein the powder particle is one selected from the group consisting of talc, silica, alumina, zeolite, calcium carbonate, magnesium carbonate, barium sulfate, zinc oxide, titanium oxide, aluminum hydroxide, magnesium hydroxide.

(3). The composition for polyolefin resin foam according to the above (1), wherein the powder particle has a particle diameter of from 0.1 to 10 µm.

(4) The composition for polyolefin resin foam according to the above (1), wherein the powder particle is contained in an amount of from 5 to 150 parts by weight based on 100 parts by weight of the polymer component.

(5) A polyolefin resin foam obtainable by foam-molding the composition for polyolefin resin foam according to claim 1.

(6) The polyolefin resin foam according to the above (5), which has a relative density in the range of from 0.02 to 0.30.

(7) The polyolefin resin foam according to the above (5), which has a load against repulsion upon compressing to 50% (50% compression strength) of 5.0 N/cm$^2$ or lower.

(8) A process for producing a polyolefin resin foam, which comprises foam-molding a composition for polyolefin resin foam which comprises:

a polymer component comprising a polyolefin resin and a rubber and/or thermoplastic elastomer, and a powder particle wherein the composition has an extensional viscosity as measured with a capillary rheometer (temperature, 200° C.; shear rate, 5,000 [1/s]) of from 20 to 100 kPa·s.

(9) The process for producing a polyolefin resin foam according to the above (8), wherein the composition is foamed with a high-pressure gas.

(10) The process for producing a polyolefin resin foam the above (9), wherein the high-pressure gas is carbon dioxide or nitrogen.

(11) The process for producing a polyolefin resin foam according to the above (10), wherein carbon dioxide in a supercritical state is used as the high-pressure gas.

In the present invention, the term "high-pressure" means 6 MPa or higher.

DETAILED DESCRIPTION OF THE INVENTION

The invention will be described below in detail.

The composition of the invention for polyolefin resin foam comprises: a polymer component comprising a polyolefin resin and a rubber and/or thermoplastic elastomer; and a powder particle.

Examples of the polyolefin resin to be used in the invention include a resin of the type having a wide molecular-weight distribution with a shoulder on the higher-molecular side, a resin of the slightly crosslinked type, and a resin of the long-chain branched type. The polyolefin resins of such types may be any of, for example, low-density polyethylene, medium-density polyethylene, high-density polyethylene, linear low-density polyethylene, polypropylene, copolymers of ethylene and propylene, copolymers of ethylene or propylene and other α-olefin(s), copolymers of ethylene and one or more of vinyl acetate, acrylic acid, acrylic esters, methacrylic acid, methacrylic esters, vinyl alcohol, and the like, and mixtures of two or more thereof.

Especially from the standpoints of suitability for thermal processing in foam molding and of shape fixing after foaming, etc., polyethylene or polypropylene is suitable. Examples of the "other α-olefin(s)" include butene-1, pentene-1, hexene-1, and 4-methylpentene-1. The copolymers may be either random copolymers or block copolymers.

The rubber or thermoplastic elastomer ingredient in the invention is not particularly limited as long as it is foamable. Examples thereof include various thermoplastic elastomers such as natural or synthetic rubbers such as natural rubber, polyisobutylene, polyisoprene, chloroprene rubbers, butyl rubbers, and nitrile-butyl rubbers; olefin elastomers such as ethylene/propylene copolymers, ethylene/propylene/diene copolymers, ethylene/vinyl acetate copolymers, polybutene, and chlorinated polyethylene; styrene elastomers such as styrene/butadiene/styrene copolymers, styrene/isoprene/styrene copolymers, and polymers obtained by hydrogenating these copolymers; polyester elastomers; polyamide elastomers; and polyurethane elastomers. These rubber or thermoplastic elastomer ingredients can be used alone or in combination of two or more thereof.

In the invention, it is preferred to use a thermoplastic elastomer as the rubber or thermoplastic elastomer ingredient. The olefin elastomer is an elastomer having a micro-domain structure made up of an olefin ingredient and an ethylene/propylene rubber and has satisfactory compatibility with the polyolefin resin.

The polymer component serving as a main component of the composition for polyolefin resin foam of the invention comprises a polyolefin resin and a rubber and/or thermoplastic elastomer. The amount of the rubber and/or thermoplastic elastomer ingredient is desirably from 10 to 150 parts by weight, preferably from 30 to 100 parts by weight, based on 100 parts by weight of the polyolefin resin.

In case where the amount of the rubber and/or thermoplastic elastomer ingredient is staller than 10 parts by weight, the composition is apt to give a foam having reduced cushioning properties. In case where the amount thereof exceeds 150 parts by weight, gas escape is apt to occur during foaming and it is therefore difficult to obtain a highly expanded foam.

The composition for polyolefin resin foam of the invention contains a powder particle. The powder particle is mainly intended to function as a nucleator in foam molding. As the powder particle can be used, for example, talc, silica, alumina, zeqlite, calcium carbonate, magnesium carbonate, barium sulfate, zinc oxide, titanium oxide, aluminum hydroxide, magnesium hydroxide, or the like.

The powder particle preferably are ones having a particle diameter of about from 0.1 to 10 μm. Powder particle having a particle diameter smaller than 0.1 μm are undesirable because there are cases where such particles do not sufficiently function as a nucleator. Powder particle having a particle diameter exceeding 10 μm are undesirable because such large particles may be causative of gas escape during foam molding.

The powder particle in the invention are contained in an amount of desirably from 5 to 150 parts by weight, preferably from 10 to 130 parts by weight, based on 100 parts by weight of the polymer component. In case where the amount of the powder particle is smaller than 5 parts by weight, an even foam is difficult to obtain. In case where the amount thereof exceeds 150 parts by weight, not only the composition for polyolefin resin foam has a considerably heightened viscosity, but also gas escape may occur during foam molding to impair suitability for foaming.

Resin foams have a drawback that they are flammable because they are constituted of a thermoplastic polymer. It is therefore preferred to incorporate any of various flame retardant as powder particle especially for applications in which impartation of flame retardancy is indispensable, as in electronic appliances. As the flame retardant can be used known flame retardants such as brominated resins, chlorinated resins, phosphorus compounds, and antimony compounds. However, the chlorinated or brominated resin flame retardants and the like have a problem that these flame retardants upon combustion emit a gas which is harmful to the human body and corrodes machines, while the phosphorus or antimony compound flame retardants also have problems concerning harmfulness, explosiveness, etc.

It is therefore preferred in the invention that a metal hydroxide be added as a non-halogen non-antimony inorganic flame retardant. Especially preferred examples of such an inorganic flame retardant include aluminum hydroxide, magnesium hydroxide, magnesium oxide/nickel oxide hydrates, and magnesium oxide/zinc oxide hydrates. Such hydrated metal compounds may have undergone a surface treatment. Flame retardant can be used alone or as a mixture of two or more thereof.

The content of such a flame retardant may be about from 10 to 70% by weight, preferably about from 25 to 65% by weight, based on the whole composition for polyolefin resin foam. Too low contents thereof result in reduced flame retardancy, while too high contents thereof result in difficulties in obtaining highly expanded resin foam.

Additives may be added to the composition for polyolefin resin foam of the invention according to need. The additives are not particularly limited in kind, and various additives in ordinary use for foam molding can be used.

Examples of the additives include crystal nucleators, plasticizers, lubricants, colorants, ultraviolet absorbers, antioxidants, fillers, reinforcements, and antistatic agents. The amount of such additives to be added maybe suitably selected as long as the incorporation thereof does not impair cell formation, etc. Addition amounts used in the molding of ordinary thermoplastic resins can be employed.

The composition of the invention for polyolefin resin foam is characterized by having an extensional viscosity as measured with a capillary rheometer (temperature, 200° C.; shear rate, 5,000 [1/s]) of from 20 to 100 kPa·s. The extensional viscosity thereof is preferably from 30 to 90 kPa·s. By regulating the composition for polyolefin resin foam so as to have an extensional viscosity of from 20 to 100 kPa·s, the composition can be made to less suffer cell wall breakage during foam molding and, hence, a high expansion ratio can be obtained. Furthermore, a pressure in the die can be maintained even when the gap is wide and, hence, foam having an increased thickness can be obtained.

Consequently, in case where the extensional viscosity of the composition is lower than 20 kPa·s, a heightened pressure is difficult to obtain in the dip tip and it is necessary to narrow the gap for obtaining a heightened pressure. Namely, a thick foam is not obtained in this case. In addition, when the gap is thus narrowed and the sheet thickness is reduced, gas escape from cells is enhanced, resulting in a further reduced expansion ratio. On the other hand, when the extensional viscosity of the composition exceeds 100 kPa·s, there are cases where the composition has reduced suitability for foam molding or where the foam obtained therefrom by foam molding has a rough surface.

In the invention, extensional viscosity is measured by the following method.

Measuring apparatus: twin-capillary rheometer "Type RH7-2" manufactured by Rothand Precision Long die: φ 1 mm; length, 16 mm; incidence angle, 180° (L/D=16)

Short die: φ 1 mm; length, 0.25 mm; incidence angle, 180° (L/D=0.25)

A resin in a pellet form is introduced into the capillaries of the capillary rheometer and heated at a given temperature for about 10 minutes. The molten resin is extruded through the lower capillary with a piston pushed down at a constant speed. Pressures of the resin which is being thus extruded are measured with pressure sensors disposed at around the inlets to the respective capillaries. The pressures thus measured are converted to a viscosity value using the following equation:

$$P_O = (P_S \cdot L_L - P_L \cdot L_L)/(L_L \cdot L_s)$$

wherein
$P_O$: pressure loss [MPa]
$P_L$: pressure loss in the long die [MPa]
$P_S$: pressure loss in the short die [MPa]
$L_L$: length of the long die [mm]
$L_s$: length of the short die [mm].

Extensional viscosity λ [kPa·s] is calculated using the following equation:

$$\lambda = 9(n+1)^2 P_O/(32\eta\gamma)$$

wherein
η: shear rate [1/s]
γ: shearing viscosity [kPa·s], calculated with $\tau = k \cdot \gamma^n$
wherein τ: shearing stress [kPa]
n: power law index
k: constant.

In the composition for polyolefin resin foam of the invention, use of the powder particle has an effect that the powder particle function as nuclei for cell growth and bring about a more even cellular structure. This effect is enhanced especially when a high-pressure gas, in particular carbon dioxide in a supercritical state, is used as the blowing agent which will be described below. Compared to foaming techniques heretofore in use, the composition of the invention can form especially fine and uniform cells.

The blowing agent to be used in the invention for obtaining a polyolefin resin foam is not particularly limited as long as it is one for ordinary use in the foam molding of polyolefin resins. However, it is preferred to use a high-pressure gas from the standpoints of environmental preservation, the property of less contaminating the resin to be foamed, etc. In this specification, the term "high-pressure gas" is used in a sense which includes a fluid in a supercritical state.

The high-pressure gas is not particularly limited as long as it infiltrates into the polyolefin resin and the rubber or thermoplastic elastomer under high pressure. Examples thereof include carbon dioxide, nitrogen, and air. These high-pressure gases may be used as a mixture of two or more thereof. Carbon dioxide is preferred of these gases because it can be infiltrated in a large amount into the polyolefin resin and rubber or thermoplastic elastomer to be used as materials for foam and because the rate of infiltration thereof is high. Furthermore, from the standpoint of heightening the rate of infiltration into the resin, the high-pressure gas (e.g., carbon dioxide) preferably is in a supercritical state. Incidentally, the critical temperature and critical pressure of carbon dioxide are 31° C. and 7.4 MPa, respectively. When a gas in a supercritical state (supercritical fluid) is used, it not only shows increased solubility in the resin and can be incorporated therein in a high concentration, but also generates a larger number of cell nuclei upon an abrupt pressure drop because of its high concentration. These cell nuclei grow to give cells, which are present in a higher density than in foams having the same porosity and produced with the gas in another state. Consequently, use of a supercritical gas can give fine cells.

The process of the invention for producing a polyolefin resin foam is not particularly limited as long as the composition for polyolefin resin foam can be subjected to foam molding. The process may be any of a batch process, continuous process, and the like.

An example in which a polyolefin resin foam is batchwise produced using a high-pressure gas as a blowing agent is shown below. First, the composition for polyolefin resin foam described above, which comprises a polymer component comprising a polyolefin resin and a rubber and/or thermoplastic elastomer and a powder particle, is extruded with an extruder such as a single-screw extruder or twin-screw extruder to thereby produce a resin sheet for foam formation.

Alternatively, the polyolefin resin is evenly kneaded beforehand together with the rubber and/or thermoplastic elastomer ingredient and the powder particle by means of a roller mill, cam mill, kneader, or a kneading machine equipped with one or more blades, e.g., one of the Banbury type, and this mixture is press-molded with, e.g., a hot plate press to thereby form a resin sheet for foam formation having a given thickness.

The unfoamed sheet thus obtained is placed in a high-pressure vessel, and a high-pressure gas comprising carbon dioxide, nitrogen, air, or the like is injected into the vessel and infiltrated into the unfoamed sheet. At the time when the high-pressure gas has been sufficiently infiltrated, the sheet is released from the pressure (the pressure is usually lowered to atmospheric pressure) to thereby generate cell nuclei in the base resin. The cell nuclei may be allowed to grow at room temperature. In some cases, however, the cell nuclei may be grown by heating.

For the heating can be used a known or common method such as, e.g., heating with a water bath, oil bath, hot roll, hot-air oven, far infrared rays, or microwave. After cells are thus grown, the sheet is rapidly cooled with, e.g., cold water to fix the shape and thereby obtain a polyolefin resin foam. The molded object to be foamed is not limited to sheets, and molded objects of various shapes can be used according to applications. Furthermore, besides being obtained by extrusion molding or press molding, the molded object to be foamed may be produced by other molding techniques including injection molding.

An example in which a polyolefin resin foam is continuously produced using a high-pressure gas as a blowing agent is shown below. The composition for polyolefin resin foam described above, which comprises a polymer component comprising a polyolefin resin and a rubber and/or thermoplastic elastomer and a powder particle, is kneaded with an extrudor such as a single-screw extruder or twin-screw extruder. During this kneading, a high-pressure gas is injected into the kneader and sufficiently infiltrated into the resin. Thereafter, the composition is extruded and thereby released from the pressure (the pressure is usually lowered to atmospheric pressure) to grow cells. In some cases, cell growth is enhanced by heating. After sells are thus grown, the extrudate is rapidly cooled with, e.g., cold water to fix the shape and thereby obtain a polyolefin resin foam. This foam molding may be conducted with an injection molding machine or the like besides extruders. The shape of the foam is not particularly limited, and may be any of sheet, prismatic, and other forms.

The pressure at which a gas is infiltrated into the molded object or kneaded resin mixture to be foamed can be suitably selected while taking account of the kind of the gas, infiltration operation, etc. However, in the case of using, for example, carbon dioxide or the like, the pressure is, for example, 6 MPa or higher (e.g., about from 6 to 100 MPa), preferably 8 MPa or higher (e.g., about from 8 to 100 MPa). In case where the pressure is lower than 6 MPa, considerable cell growth occurs during foaming and this tends to result in too large cell diameters and hence in a reduced soundproofing effect.

The reasons for this are as follows. When a low pressure is used, the amount of the gas infiltrated is relatively small as compared with infiltration at higher pressures and the rate of cell nucleus formation is low. As a result, the number of cell nuclei formed is small. Because of this, the gas amount per cell increases rather than decreases, resulting in exceeding large cell diameters. Furthermore, in a region of pressures lower than 6 MPa, only a slight change in infiltration pressure results in considerable changes in cell diameter and cell density and, hence, it is difficult to regulate call diameter and cell density.

The temperature for the gas infiltration step varies depending on the kinds of the inert gas and thermoplastic resin to be used, etc., and can be selected in a wide range. However, when infiltration operation and the like are taken into account, the infiltration temperature is, for example, about from 10 to 350° C. For example, in the case where an inert gas is batch-wise infiltrated into an unfoamed molded object in a sheet form or the like, the infiltration temperature is about from 10 to 200° C., preferably about from 40 to 200° C. In the case of the continuous process in which a molten polymer into which a gas has been infiltrated is extruded to simultaneously conduct foaming and molding, the infiltration temperature is generally about from 60 to 350° C. Incidentally, when carbon dioxide is used as an inert gas, it is preferred to infiltrate the gas at a temperature of 32° C. or higher, especially 40° C. or higher, in order to maintain its supercritical state.

In the decompression step, although the rate of decompression is not particularly limited, it is preferably about from 5 to 300 MPa/sec from the standpoint of obtaining uniform fine cells. In the heating step, the heating temperature is, for example, about from 40 to 250° C., preferably about from 60 to 250° C.

The process for polyolefin resin foam production of the invention has an advantage that a foam having a high expansion ratio can be produced and, hence, a thick foam can be produced. Specifically, this advantage is as follows. In the case where a polyolefin resin foam is produced by a continuous process, the procedure comprises kneading the composition for polyolefin resin foam, injecting a high-pressure gas into the kneading machine during the kneading to sufficiently infiltrate the high-pressure gas into the resin, and then extruding the composition to thereby release it from the pressure. In this operation, for maintaining the pressure in the extruder, it is necessary to regulate the gap in the die at the tip of the extruder so as to be as narrow as possible (generally from 0.1 to 1.0 mm).

This means that for obtaining a thick foam, the composition for foam formation which has been extruded through the narrow gap should be foamed at a high expansion ratio. In the related-art techniques heretofore in use, however, a high expansion ratio is not obtained and the foams formed thereby have hence been limited to thinones (e.g., ones having a thickness of about from 0.5 to 2.0 mm).

In contrast, by the process of the invention, a foam having a final thickness of from 0.50 to 5.00 mm can be continuously obtained. In order to obtain such a thick foam, the relative density of the foam (density of the sheet after foaming/density of the unfoamed sheet) is desirably from 0.02 to 0.3, preferably from 0.05 to 0.25. Relative densities thereof exceeding 0.3 are undesirable because foaming is insufficient, while relative densities thereof lower than 0.02 are undesirable because the foam may have considerably reduced strength.

The foam thus obtained has excellent shape retention. Namely, the expansion ratio immediately after foaming is retained and the foam does not shrink considerably. The foam further has high cushioning properties. For example, the foam has a load against repulsion upon compressing to 50% (50% compression strength) of about 5.0 N/cm$^2$ or lower (e.g., about from 0.1 to 5.0 N/cm$^2$), preferably 4.0 N/cm$^2$ or lower (e.g., from 0.3 to 4.0 N/cm$^2$).

When the load against repulsion upon compressing to 50% of the foam exceeds 5.0 N/cm$^2$, there are cases where use of the foam as an internal insulator or cushioning material in an electronic appliance or the like results in a trouble that circuit board deformation occurs and a sufficient effect is not obtained.

The thickness and relative density of the foam to be produced can be regulated by suitably selecting or determining operational conditions in the gas infiltration step, such as temperature, pressure, and time period, operational conditions in the decompression step, such as decompression rate, temperature, and pressure, and other conditions including, e.g., heating temperature after decompression, according to the kinds of the inert gas to be used and of the polyolefin resin and rubber or thermoplastic elastomer used.

The polyolefin resin foam of the invention can be used, for example, as an internal insulator for electronic appliances or the like, cushioning material, sound insulator, heat insulator, food packaging material, clothing material, building material, etc.

EXAMPLES

The invention will be explained below in detail by reference to Examples, but the invention should not be construed as being limited by these Examples in any way. The extensional viscosities of resins were measured by the method described above. Relative density and 50% compression strength were measured or calculated by the following methods.

(Relative Density)

Relative density={density after foaming (density of the foam) (g/cm$^3$)}÷{density before foaming (density of the sheet or the like to be foamed) (g/cm$^3$)

(50% Compression Strength)

Several test pieces cut out in a 30-mm square were superposed so as to result in an overall thickness of about 25 mm. The test pieces superposed were compressed to 50% at a compression rate of 10 mm/min, and the stress in this state was measured, This stress per unit area was taken as 50% compression strength.

Example 1

Forty-five parts by weight of polypropylene was kneaded together with 45 parts by weight of a polyolefin elastomer, 120 parts by weight of magnesium hydroxide (average particle diameter, 0.7 μm), and 10 parts by weight of carbon at a temperature of 200° C. by means of a twin-screw kneader manufactured by JSW. Thereafter, the resultant mixture was extruded into strands, which were cooled with water and then cut into pellets. Thus, a composition for polyolefin resin foam was produced which had an extensional viscosity at 200° C. of 40.3 kPa·s.

These pellets were introduced into a single-screw extruder manufactured by JSW. A gas was injected into the extruder in an atmosphere of 220° C. at a pressure of 22 MPa (19 MPa after injection) to fully saturate the melt with the gas. Thereafter, the melt was cooled to a temperature suitable for foaming and then extruded through a die to obtain a foam.

This foam had a relative density of 0.150 and a 50% compression strength of 3.5 N/cm$^2$. The die had a gap of 0.2 mm, and the thickness of the foam obtained therewith was 1.4 mm.

Example 2

Forty-five parts by weight of polypropylene was kneaded together with 45 parts by weight of a polyolefin elastomer, 10 parts by weight of polyethylene, 120 parts by weight of magnesium hydroxide (average particle diameter, 0.7 μm), and 10 parts by weight of carbon at a temperature of 200° C. by means of a twin-screw kneader manufactured by JSW. Thereafter, the resultant mixture was extruded into strands, which were cooled with water and then cut into pellets. Thus, a composition for polyolefin resin foam was produced which had an extensional viscosity at 200° C. of 52.5 kPa·s.

These pellets were introduced into a single-screw extruder manufactured by JSW. A gas was injected into the extruder in an atmosphere of 220° C. at a pressure of 19 MPa (16 MPa after injection) to fully saturate the melt with the gas. Thereafter, the melt was cooled to a temperature suitable for foaming and then extruded through a die to obtain a foam.

This foam had a relative density of 0.125 and a 50% compression strength of 2.5 N/cm$^2$. The die had a gap of 0.2 mm, and the thickness of the foam obtained therewith was 1.7 mm.

Example 3

Forty-five parts by weight of polypropylene was kneaded together with 45 parts by weight of a polyolefin elastomer, 10 parts by weight of polyethylene, 120 parts by weight of magnesium hydroxide (average particle diameter, 0.7 μm), and 10 parts by weight of carbon at a temperature of 200° C. by means of a twin-screw kneader manufactured by JSW. Thereafter, the resultant mixture was extruded into strands, which were cooled with water and then cut into pellets. Thus, a composition for polyolefin resin foam was produced which had an extensional viscosity at 200° C. of 83.7 kPa·s.

These pellets were introduced into a single-screw extruder manufactured by JSW. A gas was injected into the extruder in an atmosphere of 220° C. at a pressure of 18 MPa (16 MPa after injection) to fully saturate the melt with the gas. Thereafter, the melt was cooled to a temperature suitable for foaming and then extruded through a die to obtain a foam.

This foam had a relative density of 0.110 and a 50% compression strength of 2.1 N/cm$^2$. The die had a gap of 0.2 mm, and the thickness of the foam obtained therewith was 2.1 mm.

Example 4

Forty-five parts by weight of polypropylene was kneaded together with 45 parts by weight of a polyolefin elastomer, 10 parts by weight of polyethylene, 10 parts by weight of magnesium hydroxide (average particle diameter, 0.7 μm), and 10 parts by weight of carbon at a temperature of 200° C. by means of a twin-screw kneader manufactured by JSW. Thereafter, the resultant mixture was extruded into strands, which were cooled with water and then cut into pellets. Thus, a composition for polyolefin resin foam was produced which had an extensional viscosity at 200° C. of 43.0 kPa·s.

These pellets were introduced into a single-screw extruder manufactured by JSW. A gas was injected into the extruder in an atmosphere of 220° C. at a pressure of 13 MPa (12 MPa after injection) to fully saturate the melt with the gas. Thereafter, the melt was cooled to a temperature suitable for foaming and then extruded through a die to obtain a foam.

This foam had a relative density of 0.04 and a 50% compression strength of 1.2 N/cm$^2$. The die had a gap of 0.3 mm, and the thickness of the foam obtained therewith was 1.9 mm.

Comparative Example 1

Forty-five parts by weight of polypropylene was kneaded together with 50 parts by weight of a polyolefin elastomer, 100 parts by weight of magnesium hydroxide (average particle diameter, 0.7 μm), and 10 parts by weight of carbon at a temperature of 200° C. by means of a twin-screw kneader manufactured by JSW. Thereafter, the resultant mixture was extruded into strands, which were cooled with water and then cut into pellets. Thus, a composition for polyolefin resin foam was produced which had an extensional viscosity at 200° C. of 10.6 kPa·s.

These pellets were introduced into a single-screw extruder manufactured by JSW. A gas was injected into the extruder in an atmosphere of 220° C. at a pressure of 22 MPa (19 MPa after injection) to fully saturate the melt with the gas. Thereafter, the melt was cooled to a temperature suitable for foaming and then extruded through a die in order to obtain a foam. However, the pressure in the die could not be maintained although the die gap was narrowed to the minimum value for the apparatus (0.1 mm). Because of this, foaming was insufficient and the composition could not be formed into a sheet.

The foams obtained from the foamable polyolefin resin compositions obtained in the Examples given above, which each comprised a polymer component comprising a polyolefin resin and a rubber and/or thermoplastic elastomer and a powder particle, through release from the pressure of a high-pressure gas in the conventional foaming step had a high expansion ratio and a sufficient thickness.

In contrast, the foam obtained in the Comparative Example had a high relative density and a sufficient expansion ratio could not be obtained.

The polyolefin resin foam of the invention has a sufficient thickness and is excellent in softness and cushioning property. By the process of the invention, such excellent foams can be efficiently produced with ease.

While the invention has been described in detail and with reference to specific embodiments thereof, it will be apparent to one skilled in the art that various changes and modifications can be made therein without departing from the scope thereof.

This application is based on Japanese patent applications No. 2003-209196 filed on Aug. 28, 2003, the entire contents thereof being hereby incorporated by reference.

What is claimed is:

1. A polyolefin resin foam obtained by subjecting a composition for polyolefin resin foam to foam molding using carbon dioxide in a supercritical state, wherein the composition comprises:

a polymer component comprising 100 parts by weight of at least one of polyethylene and polypropylene and 10 to 150 parts by weight an elastomer having a micro-domain structure made up of an olefin ingredient and an ethylene/propylene rubber, and a powder particle having a particle diameter of from 0.1 to 10 μm, wherein the powder particle is contained in an amount of from 5 to 150 parts by weight based on 100 parts by weight of the polymer component, wherein the composition has an extensional viscosity as measured with a capillary rheometer (temperature, 200° C.; shear rate, 5,000 [1/s]) of from 20 to 100 kPa·s, wherein the polyolefin resin foam has a relative density in the range of from 0.02 to 0.30, wherein the polyolefin resin foam has a load against repulsion upon compressing to 50% (50% compression strength) of 5.0 N/cm$^2$ or lower, and wherein the final thickness of the obtained foam is from 0.5 to 5.0 mm.

2. The polyolefin resin foam according to claim 1, wherein the powder particle is one selected from the group consisting of talc, silica, alumina, zeolite, calcium carbonate, magnesium carbonate, barium sulfate, zinc oxide, titanium oxide, aluminum hydroxide, and magnesium hydroxide.

3. A process for producing a polyolef resin foam, which comprises foam-molding a composition for polyolefin resin foam which comprises:

a polymer component comprising 100 parts by weight of at least one of polyethylene and polypropylene and 10 to 150 parts by weight an elastomer having a micro-domain structure made up of an olefin ingredient and an ethylene/propylene rubber, and a powder particle having a particle diameter of from 0.1 to 10 μm, wherein the composition has an extensional viscosity as measured with a capillary rheometer (temperature, 200° C.; shear rate, 5,000 [1/s]) of from 20 to 100 kPa·s, wherein the polyolefin resin foam has a relative density in the range of from 0.02 to 0.30, wherein the polyolefin resin foam has a load against repulsion upon compressing to 50% (50% compression strength) of 5.0 N/cm$^2$ or lower, and wherein the final thickness of the obtained foam is from 0.5 to 5.0 mm.

4. The process for producing a polyolefin resin foam of claim 3, wherein the composition is foamed with a high-pressure gas.

5. The process for producing a polyolefin resin foam of claim 4, wherein the high-pressure gas is carbon dioxide or nitrogen.

6. The process for producing a polyolefin resin foam of claim 5, wherein carbon dioxide in a supercritical state is used as the high-pressure gas.

* * * * *